Sept. 18, 1934. A. H. REIBER Re. 19,321
SELECTOR
Original Filed Sept. 2, 1922
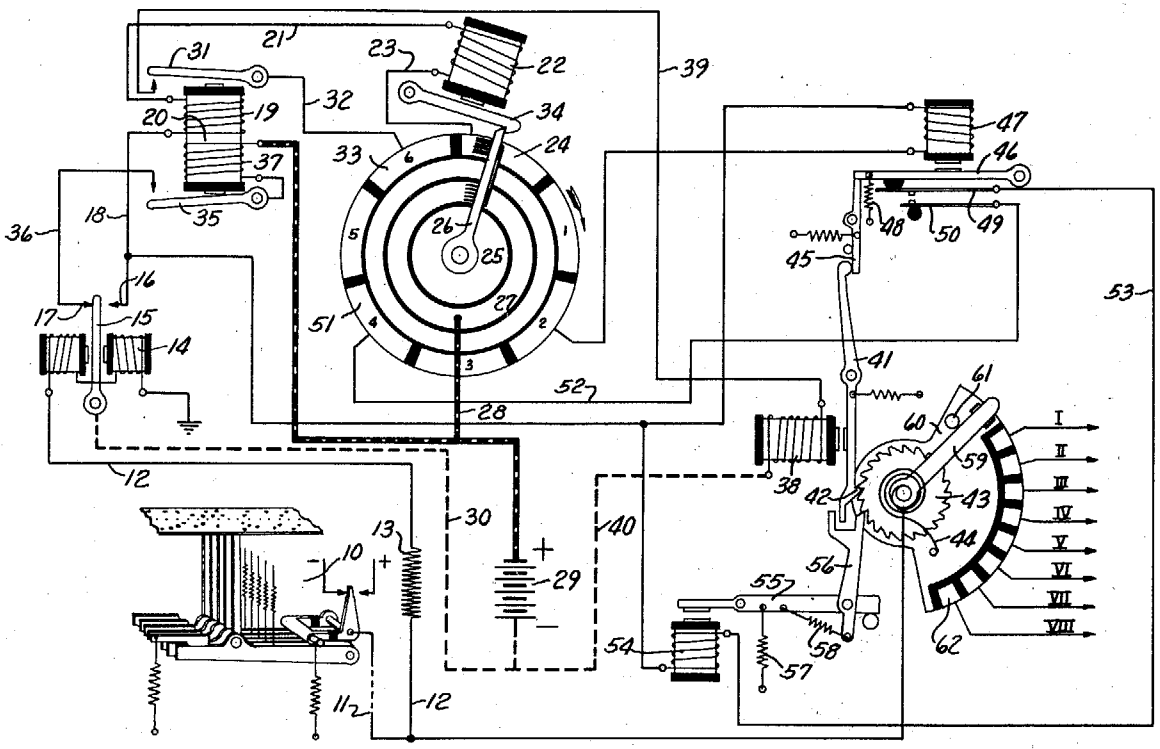
INVENTOR
ALBERT H. REIBER
BY H. B. Whitfield
ATTORNEY Reissued Sept. 18, 1934

Re. 19,321

UNITED STATES PATENT OFFICE 19,321

SELECTOR

Albert H. Reiber, Evanston, Ill., assignor, by mesne assignments, to Teletype Corporation, Chicago, Ill., a corporation of Delaware Original No. 1,514,792, dated November 11, 1924, Serial No. 585,870, September 2, 1922. Application for reissue July 13, 1934, Serial No. 735,051

13 Claims. (Cl. 178—23)

Printing telegraph systems of modern type include a transmitting station and receiving stations which latter may be connected over a number of individual lines to a plurality of subsidiary stations. The present invention provides means for automatically selecting any of the individual lines to which connection is desired.

The drawing illustrates a diagram of a receiving station to which eight individual lines are connected. A transmitting station is schematically indicated. Both stations may be combined in one unit. The selection of individual lines is originated by means of code-signals according to the Baudot or similar codes, translated by means of a perforated tape, which signals may preferably comprise a blank signal and include such other signals as normally are used for effecting various mechanical functions of a telegraph-printer.

Printing telegraph apparatus to which the present invention is peculiarly adapted is disclosed in Patents Nos. 1,564,421 and 1,463,136 for a transmitting device and a receiving device respectively. It is understood that the individual elements shown in the drawing of the present case, or their equivalents, are also shown in the patents above enumerated, except such devices as are added thereto or modified, to accomplish the specific objects of the present invention.

In a general way, three typical Baudot signals are utilized to produce the desired results in selecting any one of the several individual lines. A blank signal consisting, preferably, of five spacing impulses, is employed to set the selecting brush-arm to normal. The carriage-return-signal, consisting of minus, minus, minus, plus, minus, sent over contact-segment No. 4 of the distributor-head, is employed to step the selecting brush-arm forward to the selected segment, one signal for each step. Finally, the line-feed-signal, consisting of minus, plus, minus, minus, minus, sent over contact-segment No. 2 of the distributor-head, is employed to disengage the line-selecting mechanism so that it will not be affected by future carriage-return-signals, unless they are preceded by a blank signal. The selection of the desired individual line depends upon the number of carriage-return-signals sent. Any other Baudot or similar code signals may, of course, be used for performing the aforementioned three objects.

The drawing indicates at 10 a telegraph-transmitter of the perforated-tape type, though it is understood that any other transmitter, including a keyboard-transmitter, may be used. The movable tongue of transmitter 10 may be connected over line 11 to the receiving unit of the apparatus, if desired, located at a distant station. A conductor 12, leads from line 11 through a resistance 13 to a polarized line-relay 14, having a movable contact-tongue 15, playing between marking contact 16 and spacing contact 17. A conductor 18 connects marking contact 16 with upper winding 19 of control relay 20, a conductor 21 further connects winding 19 with start magnet 22, from where conductor 23 leads to start segment 24 of distributor-head 25. A rotatable brush-arm 26 travels over the face of the distributor-head, in the direction of the arrow, indicated in the drawing, and connects the outer ring containing start segment 24 and segments 1, 2, 3, 4, 5 and 6, with battery-ring 27, and by means of conductor 28 leads to positive pole of battery 29, the negative pole of which is connected by means of conductor 30 to contact-tongue 15 of line-relay 14.

The energization of control relay 20 results in the attraction of armature 31, connected by means of conductor 32 to sixth-impulse-segment 33 of distributor-head 25. Traveling arm 26 of distributor-head 25 is adapted to be engaged by detent 34, forming the armature of start magnet 22. The arm 26 is secured on a friction-driven shaft, and energization of magnet 22, resulting in attraction of armature 34, releases arm 26 for one full revolution, as now well known in printing telegraph apparatus.

Control relay 20 is provided with a second armature 35, which may be integral with armature 31, and the fixed contact-point for same is connected, by means of conductor 36, to spacing contact-point 17, of contact-tongue 15. The pivot of armature 35 is connected to one terminal of winding 37 of control relay 20, the second terminal of which leads to positive pole of battery 29. It will now be noticed that energization of winding 37 of contral relay 20, in the event that contact-tongue 15 is in contact with spacing contact-point 17, results in the closing of a locking circuit for control relay 20, until contact-tongue 15, on proper energization of polarized relay 14, opens spacing contact-points 17 and again closes marking contact-points 16.

The energization of control relay 20 and the attraction of armature 31, after proper rotation of brush-arm 26, results in the energization of releasing magnet 38, over conductor 39, leading to one terminal of its winding, the second terminal of which leads to negative pole of battery 29, over conductor 40. Releasing magnet 38 is provided with armature-lever 41, having a detent 42 adapted to engage one of the teeth of ratchet 43 and forming the holding pawl for the ratchet against the tension of spiral-spring 44. Armature-lever 41 acts upon one arm of biased latch 45, the second arm of which normally supports the end of armature 46, of line-feed-signal-relay 47, biased by spring 48 to close contact-springs 49 and 50, on the removal of latch 45. Contact spring 50 is connected to fourth-impulse-segment 51 of distributor-head 25, over wire 52, while contact-spring 49 is connected over conductor 53 to one terminal of the winding of stepping magnet 54, the second terminal of which is connected to negative pole of battery 29 through tongue 15 of line-relay 14 upon its operation in response to a carriage return signal.

Stepping magnet 54 attracts armature 55, having a stepping pawl 56 pivoted thereto. Spring 57 tends to pull armature 55 away from magnet 54, and spring 58 forces the end of stepping pawl 56 against the teeth of ratchet 43. A rotatable arm 59 is secured to ratchet 43 and capable of traveling on selector-head 60. It normally rests against stop 61, but it is successively making contact with selector-segments 62 of the subsidiary lines I to VIII, inclusive.

*Operation*

The drawing shows a schematic wiring diagram of a transmitting station for sending signals to any one of a number of departments or sub-stations over lines I to VIII, inclusive.

In order to automatically select, preferably by means of a perforated tape, any one of the different sub-station lines, the procedure is, as follows:—Assuming that a message is to be sent to a sub-station over wire III, the blank code-signal is first perforated on the tape, then three carriage-return-signals and then a line-feed-signal. The function of the blank code-signal is to return the lever 59 to its point of rest against stop 61 and to set the mechanism so that the following carriage-return-signals will step the traveling arm 59 forward. The selection of the proper sub-station depends upon the number of carriage-return-signals perforated in the tape. The function of the following line-feed-signal is to disengage the line-selecting mechanism so it will not be affected by future carriage-return-signals, unless these signals are preceded by a blank-code signal.

When a marking impulse is sent from transmitter 10, line-relay-tongue 15 moves into contact with its marking contact and thereby energizes control relay 20, as well as start magnet 22. If a blank-signal follows, relay-tongue 15 then returns to its spacing-contact-point 17, and locks up relay 20, through armature 35 and winding 37. The contacts of armature 31 remain closed while brush-arm 26 passes over segments 1, 2, 3, 4 and 5, and moves to sixth-impulse-segment 33. When brush 26 reaches sixth-impulse-segment 33, magnet 38 is operated and permits spring 44 to return arm 59 to stop 61. The energization of magnet 38 also closes contact-springs 49 and 50, thereby providing a path from the fourth-segment 51 of distributor-head 25 to stepping magnet 54. For each carriage-return-signal that follows, line relay 14 will respond accordingly and arm 59 of auxiliary distributor-head 60 will be stepped forward by magnet 54 the distance of one segment. If the third sub-station is desired, three carriage-return-signals are used to step arm 59 to the third of the segments 62, thereby connecting transmitter 10 and line 11 directly to line III. When now the next line-feed-signal is received, magnet 47 is operated under control of line relay 14 in response to the line feed signal, contact-springs 49 and 50 are again opened and subsequent carriage-return-signals cannot affect magnet 54.

Magnet 38 is only operated when a blank-code signal is sent. If, after the start impulse is sent, any one or more of the five selecting impulses are of marking polarity, line-relay-tongue 15 moves away from its spacing contact-point 17 and breaks the locking circuit to relay 20. While brush-arm 26 of distributor-head 25 reaches in its one revolution the sixth-impulse-segment 33, therefore, the contact of armature 31 is broken and the magnet 38 will not be operated so as to set the entire mechanism to normal.

The substance of the present invention, as it appears from the foregoing disclosure, includes the utilization of code signals of the Baudot or other type, other than the code signals representing printing characters, for controlling selective apparatus to establish connection between a main station and any of a number of sub-stations.

It is old in the art to utilize such code-signals in telegraph-printers for the purpose of controlling the mechanical functions of the printer, but it is thought to be broadly new to utilize the same in the manner and for the purpose herein set forth.

As new is claimed:—

1. The method of selective signaling which consists in imparting to a line, code signals of a variety of five impulses of different polarity, and causing, first, a signal comprising impulses of uniform polarity to initiate operation of a selecting receiver, then causing another signal comprising impulses of different polarity, to selectively connect the calling line with the selected line, and finally, causing still another signal to guard the established connection against interference by subsequent signals.

2. The method of selective signaling which consists in imparting to a line, code signals of a variety of impulses of different polarity, and causing, first, a signal comprising impulses of uniform polarity to initiate operation of a selecting receiver, then causing another signal comprising impulses of different polarity, to selectively connect the calling line with the selected line, and finally, causing still another signal to guard the established connection against interference by subsequent signals.

3. The method of selective signaling which consists in imparting to a line, code signals of a variety of five impulses of different polarity, and causing, first, a signal comprising impulses of uniform polarity to initiate operation of a selecting receiver, then causing a signal comprising impulses of different polarity and non-representative of printing characters to selectively connect the calling line with the selected line, and finally, causing another signal non-representative of printing characters, to guard the established connection against interference by subsequent signals.

4. The method of selective signaling which consists in imparting to a line, code signals of a variety of impulses of different polarity, and causing, first, a signal comprising impulses of uniform polarity to initiate operation of a selecting receiver, then causing a signal comprising impulses of different polarity and non-representative of printing characters to selectively connect the calling line with the selected line, and finally, causing another signal non-representative of printing characters, to guard the established connection against interference by subsequent signals.

5. A printing telegraph system comprising a transmitting station having means for sending telegraphic code combinations of line impulses, a receiving station, a main line connecting the same, impulse receiving and impulse distributing means at said receiving station, sub-station lines, and means for causing certain of said code combinations of impulses to selectively connect any of said sub-station lines to said main line.

6. A printing telegraph system comprising a transmitting station having means for sending telegraphic code combinations of line impulses, a receiving station, a main line connecting the same, impulse receiving means at said receiving station, sub-station lines, and means for causing certain of said code combinations of impulses to selectively connect any of said sub-station lines to said main line.

7. A printing telegraph system comprising a main line, transmitting mechanism having a perforated tape transmitter for transmitting telegraphic code combinations of impulses, receiving mechanism, impulse receiving and impulse distributing means in said receiving mechanism, sub-station lines, and means responsive to certain of said code combinations for selectively connecting any of said sub-station lines to said main line.

8. A printing telegraph system comprising a line relay, a control relay, a start magnet controlled by said line relay, a rotary distributor initiated in operation and arrested in operation at the beginning and end of each revolution respectively, by said magnet, a signal relay controlled by said distributor, a circuit controlled by said distributor, signal relay and line relay, a stepping magnet in said circuit, and a sub-station distributor controlled by said stepping magnet.

9. A printing telegraph system comprising a line relay, a control relay, a start magnet controlled by said line relay, a rotary distributor initiated in operation and arrested in operation at the beginning and end of each revolution respectively, by said magnet, a signal relay controlled by said distributor, a circuit controlled by said distributor, signal relay and line relay, a stepping magnet in said circuit, a sub-station distributor controlled by said stepping magnet, and a releasing magnet for said sub-station distributor controlled by said control relay.

10. A printing telegraph system comprising means for transmitting code combinations of impulses to a main line, and means auxiliary to said transmitting means and controlled by certain of said code combinations of impulses from said transmitting means to connect said main line selectively to one of a plurality of branch lines.

11. The combination as set forth in claim 10 in which said transmitting means is arranged to transmit said impulses successively to said line, and in which said last mentioned means comprises a rotary distributor.

12. The combination as set forth in claim 10 in which said last mentioned means comprises a step by step rotary distributor for connecting said main line to said branch lines.

13. A printing telegraph system comprising means for transmitting code combinations of impulses to a main line, a step-by-step distributor auxiliary to said transmitting means and controlled by certain of said code combinations of impulses from said transmitting means to connect said main line selectively to one of a plurality of branch lines, and means for restoring said distributor to initial position in response to transmission of a special code combination of impulses and to thereafter advance said distributor step by step in response to the transmission of a second code combination of impulses and finally in response to a third code combination of impulses to render said distributor unresponsive to said second and said third code combinations of impulses.

ALBERT H. REIBER.